United States Patent
Toyoda et al.

(10) Patent No.: US 6,243,942 B1
(45) Date of Patent: *Jun. 12, 2001

(54) ASSEMBLY JIG FOR OPTICAL FIBER GYRO AND METHOD OF ASSEMBLING OPTICAL FIBER GYRO

(75) Inventors: Shuhei Toyoda, Nagoya; Takenori Ichigi, Iwakura, both of (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,756

(22) Filed: Sep. 22, 1997

(30) Foreign Application Priority Data

Sep. 25, 1996 (JP) ...................................... 8-253553

(51) Int. Cl.[7] ...................................... B23P 15/00
(52) U.S. Cl. .............................................. 29/759
(58) Field of Search ...................... 269/47, 52; 385/12, 385/134, 135, 137; 356/345, 350; 29/281.5, 759

(56) References Cited

U.S. PATENT DOCUMENTS

| | | | |
|---|---|---|---|
| 4,722,585 | * | 2/1988 | Boyer . |
| 4,765,708 | * | 8/1988 | Becker et al. . |
| 5,050,732 | * | 9/1991 | Hunsicker, Jr. . |
| 5,069,523 | | 12/1991 | Finzel . |
| 5,085,501 | * | 2/1992 | Sakuma et al. . |
| 5,131,211 | * | 7/1992 | Hunsicker, Jr. . |
| 5,142,661 | * | 8/1992 | Grant et al. . |
| 5,285,515 | * | 2/1994 | Milanowski et al. . |
| 5,311,612 | * | 5/1994 | Vincent et al. . |
| 5,383,051 | * | 1/1995 | Delrosso et al. . |
| 5,469,526 | * | 11/1995 | Rawlings . |
| 5,703,990 | * | 12/1997 | Robertson et al. . |
| 5,802,237 | * | 9/1998 | Pulido . |

FOREIGN PATENT DOCUMENTS

| | | | | |
|---|---|---|---|---|
| 480-442 | * | 4/1992 | (EP) | ...................................... 356/350 |
| 4106171 | * | 9/1992 | (EP) | ...................................... 385/135 |
| 0 592 114 A2 | | 4/1994 | (EP) | . |
| 0 487 509 B1 | | 5/1995 | (EP) | . |
| 0 726 475 A1 | | 8/1996 | (EP) | . |
| 2181270 | * | 4/1987 | (GB) | ...................................... 385/135 |
| 58-223112 | * | 12/1983 | (JP) | ...................................... 385/135 |

(List continued on next page.)

OTHER PUBLICATIONS

"Investigation of the Effects of Temporal Thermal Gradients in Fiberoptic Gyroscope Sensing Coils", C.M. Lofts et al.; vol. 34, No. 10; Oct. 1, 1995; pp.2856–2862, XP000534314 *figure 6*.

*Primary Examiner*—David Bryant
(74) *Attorney, Agent, or Firm*—Parkhurst & Wendel, L.L.P.

(57) ABSTRACT

An assembly jig for assembling a phase-modulation-type optical fiber gyro has a reel support area for supporting a fiber coil reel with an elongate optical fiber wound therearound and a coupler reel with optical fibers from a coupler wound therearound, the fiber coil reel and the coupler reel being rotatably supported on a base plate of the assembly jig through a support shaft. The assembly jig also has a chip support base disposed on the base plate for temporarily supporting thereon the optical IC chip optically connected to the optical fibers, a package housing support base disposed on the base plate for supporting a package housing of a package to encase the optical IC chip therein and substantially packaging the optical IC chip with the package housing, and a lid support base disposed on the base plate for supporting a lid to cover the package housing. The assembly jig allows the optical fiber gyro to be assembly easily at a reduced cost.

7 Claims, 11 Drawing Sheets

U.S. PATENT DOCUMENTS

| | | | | |
|---|---|---|---|---|
| 59-170718 | * | 9/1984 | (JP) | 356/350 |
| 60-169811 | * | 9/1985 | (JP) | 385/135 |
| 61-288110 | * | 12/1986 | (JP) | 356/350 |
| 4-110904 | * | 4/1992 | (JP) | 385/135 |
| 5-288941 | * | 11/1993 | (JP) | 385/134 |
| WO 98/33040 | | 7/1998 | (WO) . | |

* cited by examiner

ASSEMBLY JIG FOR OPTICAL FIBER GYRO AND METHOD OF ASSEMBLING OPTICAL FIBER GYRO

BACKGROUND OF THE INVENTION

1. Field of the Invention

The present invention relates to an assembly jig for assembling an optical fiber gyro having an optical fiber coil which comprises a number of turns of an optical fiber having a length of several tens of meters, for example, and a method of assembling such an optical fiber gyro.

2. Description of the Related Art

There have recently been proposed and used automobile navigation systems which use a gyroscope for detecting the bearing of the automobile that incorporates such an automobile navigation system. An optical fiber gyro which is highly easy and convenient to operate, small in size and light in weight, free of mechanically movable parts, highly durable, and highly accuracy has been proposed for use as a gyroscope in automobile navigation systems. Development activities are presently in progress to put optical fiber gyros to use.

The optical fiber gyro comprises an optical fiber coil which comprises a number of turns of an optical fiber having a length of several tens of meters, and serves as a sensor for detecting an angular velocity from a phase difference (Sagnac phase difference) between two lightwaves that are propagated in opposite directions through the optical fiber coil. There are two types of optical fiber gyros, i.e., an open-loop optical fiber gyro and a closed-loop optical fiber gyro.

The open-loop optical fiber gyro is of a simple structure. However, since the open-loop optical fiber gyro employs analog detection of a light level, the scale factor thereof tends to vary if the average light level changes due to a change in a loss caused by the optical system.

The closed-loop optical fiber gyro operates by generating an optical phase bias between lightwaves passing in opposite directions for thereby canceling out a Sagnac phase difference. The closed-loop optical fiber gyro determines an angular velocity from the phase bias that has been established. Because the closed-loop optical fiber gyro directly detects a phase difference, it has better scale factor accuracy. However, the closed-loop optical fiber gyro requires an optical integrated circuit to be inserted in an optical path as a high-speed phase modulator which has sufficiently good frequency characteristics, and hence is relatively complex in structure. Nevertheless, since the closed-loop optical fiber gyro provides the level of performance that is comparable to those gyros which are used in inertial navigation systems for aircrafts, the closed-loop optical fiber gyro may possibly be a final candidate for high-performance interferrometric optical fiber gyros.

There has also been proposed an open-loop optical fiber gyro whose scale factor is electrically corrected. The proposed open-loop optical fiber gyro has sufficient performance for use in automobile navigation systems though it is not comparable to gyros in inertial navigation systems for aircrafts.

A process of assembling optical fiber gyros which are small in size, light in weight, and durable in use comprises the steps of winding an elongate optical fiber around a cylindrical object to produce a fiber coil, optically connecting an optical IC chip (optical waveguide) which incorporates a phase modulator to two ends of the optical fiber extending from the fiber coil, optically connecting an optical fiber from a light source to an optical fiber leading to a photodetector with a coupler, optically connecting an optical fiber extending from the coupler to the optical IC chip, and packaging the optical IC chip. Therefore, the assembling process is highly complex.

The fiber coil, when produced, is removed from the cylindrical object, and the ends of the optical fiber extending from the fiber coil are secured in position by a tape or the like. Therefore, during the assembling process, some of the turns of the fiber coil may become loose, and the fiber coil needs to be manually turned. The optical fiber extending from the coupler is very long, and tends to present an obstacle when it is optically connected to the optical IC chip. When the optical IC chip is packaged, it is necessary to bundle and support the elongate optical fiber so that the elongate optical fiber will not impose excessive loads on the optical IC chip. These complexities lower the efficiency of the assembling process.

Consequently, the assembling process for the conventional optical fiber gyros is time-consuming, and poses limitations on efforts to reduce the cost of the manufacture of the conventional optical fiber gyros.

SUMMARY OF THE INVENTION

It is therefore an object of the present invention to provide an assembly-jig which allows an optical fiber gyro to be assembled with ease at a reduced cost, and a process of assembling an optical fiber gyro with ease at a reduced cost.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

The principles of the present invention are particularly useful when applied to assembling an optical fiber gyro.

Figure 1:
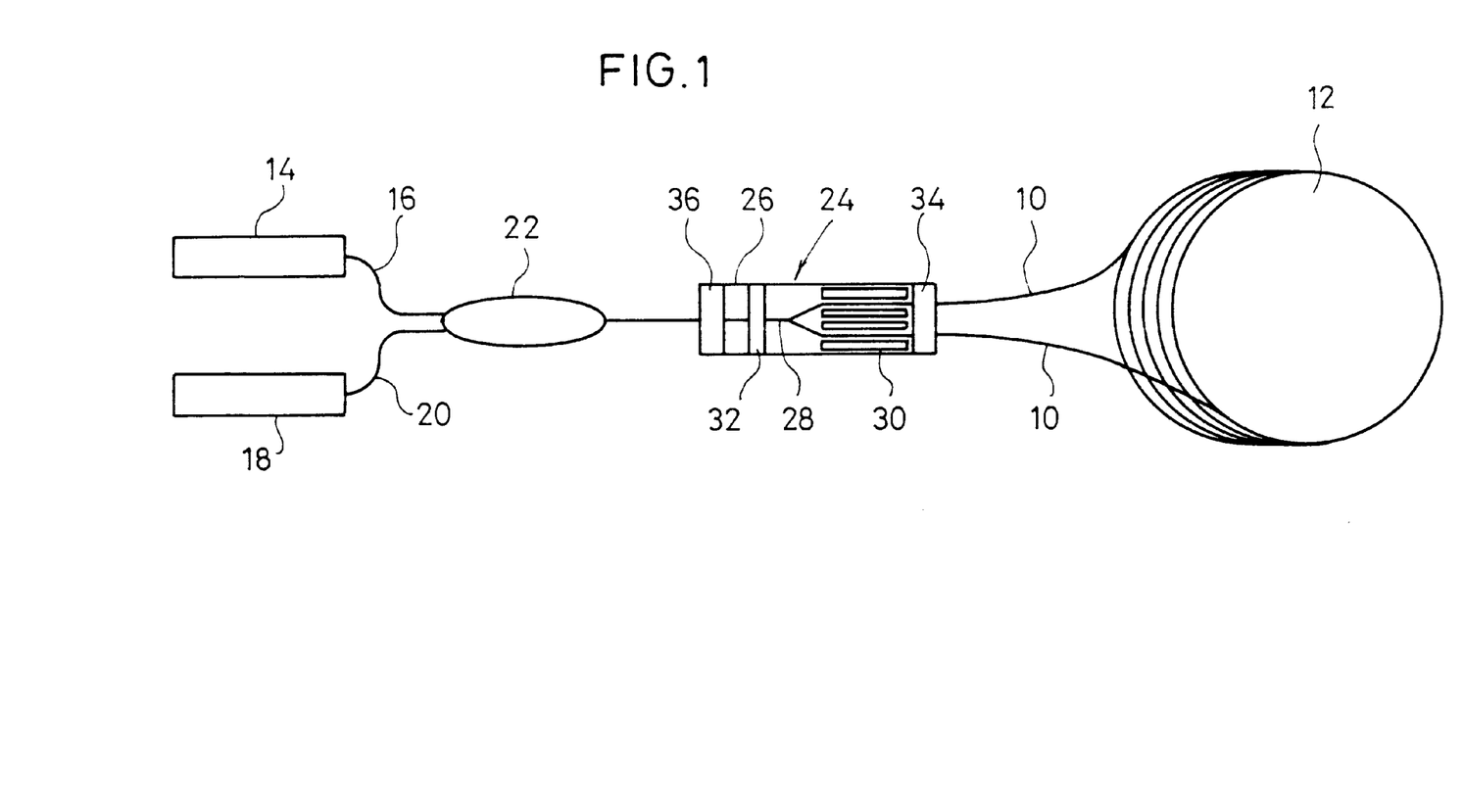
FIG. 1 is a plan view of an optical fiber gyro assembled by an assembly jig according to the present invention.

As shown in FIG. 1, an optical fiber gyro comprises a fiber coil 12 which comprises a number of turns of an elongate optical fiber 10 whose core has an elliptical cross-sectional shape, a coupler 22 optically connecting an optical fiber 16 extending from a light source 14 to an optical fiber 22 leading to a photodetector 18, and an optical IC chip 24 connected between the fiber coil 12 and the coupler 22. The optical IC chip 24 comprises an optical waveguide 28 of a predetermined shape, such as an Y-shaped optical waveguide, for example, mounted on an LiNbO$_3$ substrate 26, and a phase modulator 30 and a polarizer 32 that are mounted on the optical waveguide 28. The light source 14 may comprise a superluminescent diode (SLD).

Figure 2A:
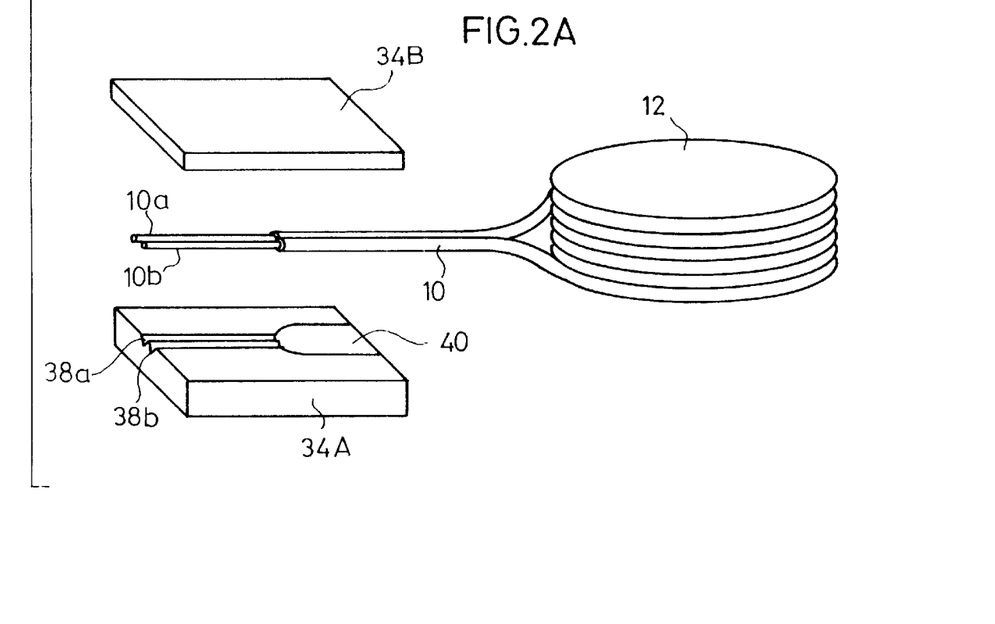
FIG. 2A is a perspective view of an assembling step for assembling a first array to an optical fiber extending from a fiber coil.
Figure 3A:
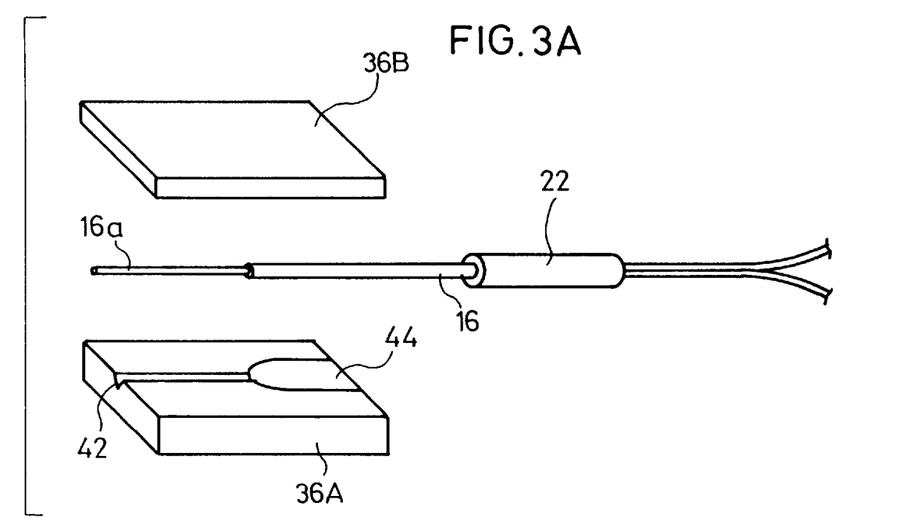
FIG. 3A is a perspective view of a bonding step for assembling a second array to an optical fiber extending from a coupler.

As shown in FIG. 2A, two ends, i.e., a starting end 10a and a terminal end 10b, of the optical fiber 10 extending from the fiber coil 12 are fixed to a first array 34 which serves to restrict the direction in which the optical fiber 10 is connected to the optical IC chip 24. As shown in FIG. 3A, an end 16a of the optical fiber 16 extending from the coupler 22 is fixed to a second array 36 which serves to restrict the direction in which the optical fiber 16 is connected to the optical IC chip 24. In this manner, the ends 10a, 10b of the optical fiber 10 and the end 16a of the optical fiber 16 are optically connected to the optical IC chip 24 through the first and second arrays 34, 36.

The first array 34 is fixed to the ends 10a, 10b of the optical fiber 10 that extends from the fiber coil 12, making up a fiber coil assembly.

Specifically, as shown in FIG. 2A, the first array 34 comprises a base substrate 34A having two V-shaped grooves 38a, 38b defined in a principal surface thereof and extending toward an end thereof and a groove 40 defined in the principal surface contiguously to the V-shaped grooves 38a, 38b and extending toward an opposite end thereof, and a lid substrate 34B placed on the base substrate 34A in covering relation to the V-shaped grooves 38a, 38b and the groove 40. The V-shaped grooves 38a, 38b are spaced from each other by such a distance that their axes are aligned with respective optical axes of two branch paths in the optical waveguide 28.

Figure 2B:
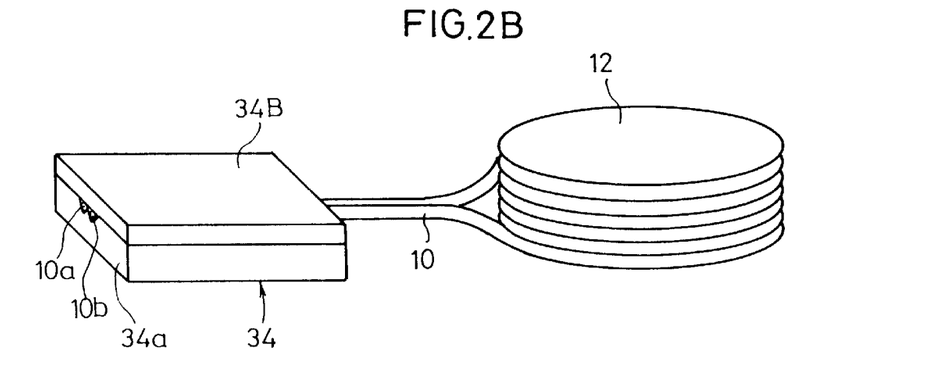
FIG. 2B is a perspective view of a grinding step for assembling the first array to the optical fiber extending from the fiber coil.

The first array 34 is assembled as follows: As shown in FIG. 2A, the ends 10a, 10b of the optical fiber 10 extending from the fiber coil 12 are placed in the respective V-shaped grooves 38a, 38b of the base substrate 34A, and thereafter a polarization plane of the optical fiber 10 is aligned with a plane of polarization of light propagated through the optical waveguide 28, e.g., the direction of the major axis of the cross-sectional shape of the core of the optical fiber 10 is aligned with the vertical direction. Subsequently, the lid substrate 34B is placed over the base substrate 34A and bonded thereto by an adhesive. Then, as shown in FIG. 2B, an end 34a of the first array 34 where free ends of the ends 10a, 10b of the optical fiber 10 are exposed is ground. The process of fixing the optical fiber 10 to the first array 34 is now completed.

As shown in FIG. 3A, the second array 36 comprises a base substrate 36A having a V-shaped groove 42 defined in a principal surface thereof and extending toward an end thereof and a groove 44 defined in the principal surface contiguously to the V-shaped groove 42 and extending toward an opposite end thereof, and a lid substrate 36B placed on the base substrate 36A in covering relation to the V-shaped groove 42 and the groove 44.

Figure 3B:
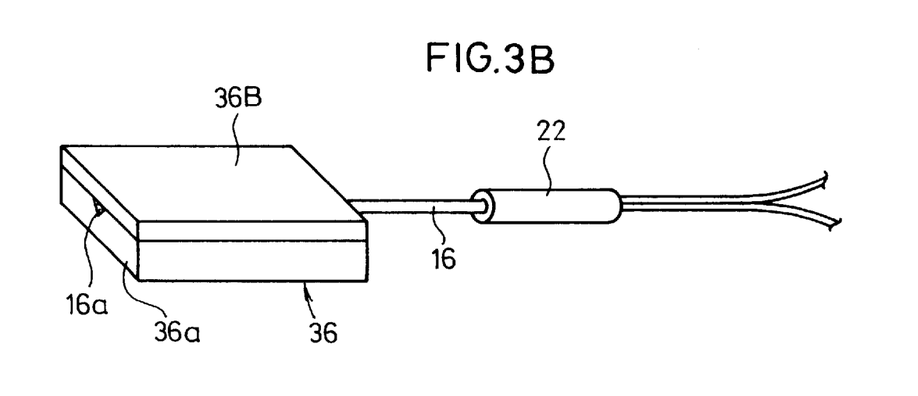
FIG. 3B is a perspective view of a grinding step for assembling the second array to the optical fiber extending from the coupler.

The second array 34 is assembled as follows: As shown in FIG. 3A, the end 16a of the optical fiber 16 extending from the coupler 22 is placed in the V-shaped groove 42 of the base substrate 36A, and thereafter a polarization plane of the optical fiber 16 is aligned with a plane of polarization of light propagated through the optical waveguide 28, e.g., the direction of the major axis of the cross-sectional shape of the core of the optical fiber 16 is aligned with the vertical direction. Subsequently, the lid substrate 36B is placed over the base substrate 36A and bonded thereto by an adhesive. Then, as shown in FIG. 3B, an end 36a of the second array 36 where a free end of the optical fiber 16 is exposed is ground. The process of fixing the optical fiber 16 to the second array 36 is now completed.

Figure 4A:
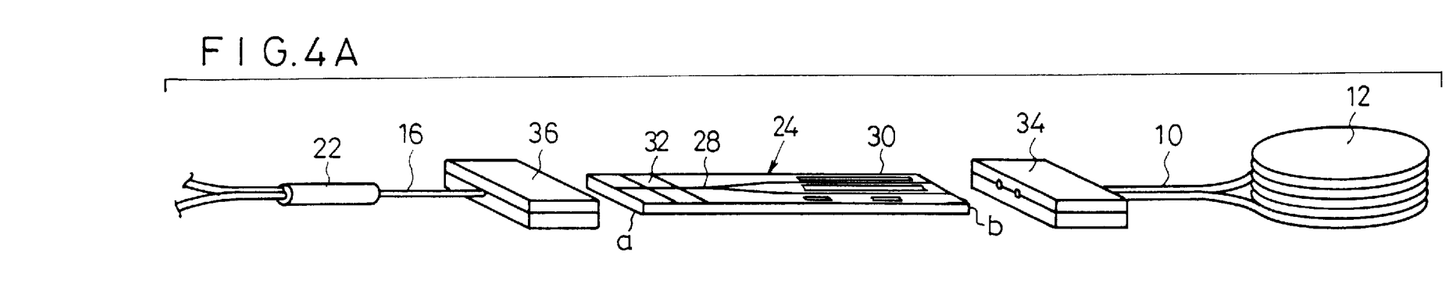
FIG. 4A is a perspective view of a positioning step for positioning an optical IC chip and the first and second arrays.
Figure 4B:
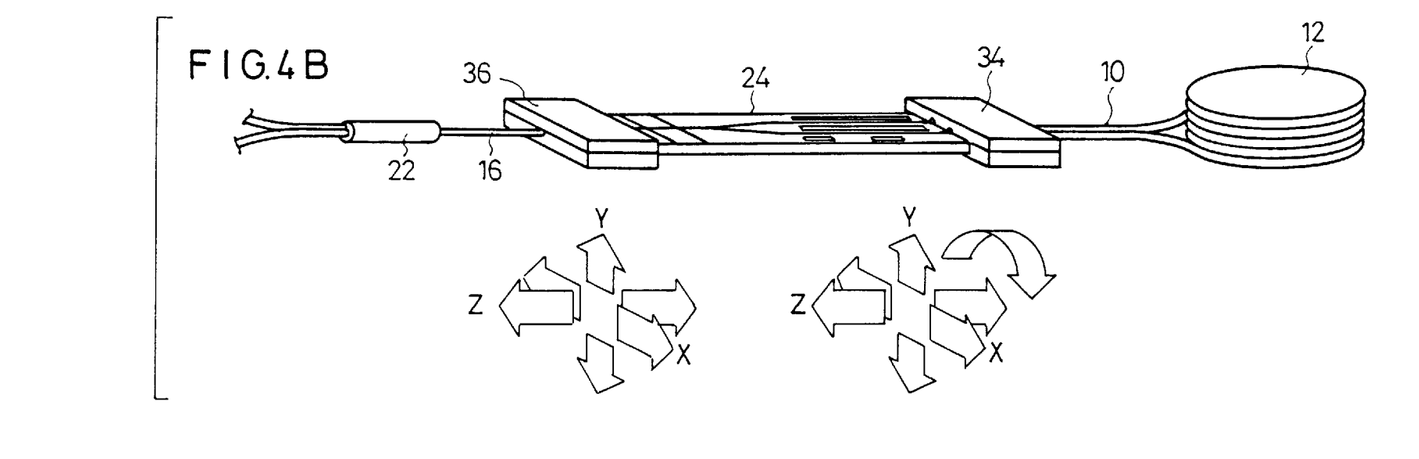
FIG. 4B is a perspective view of optical axis adjusting and bonding steps for the optical IC chip and the first and second arrays.

Thereafter, as shown in FIGS. 4A and 4B, the first and second arrays 34, 36 to which the optical fibers 10, 16 have been connected are joined to the optical IC chip 24. Specifically, the second array 36 is joined to an end a of the optical IC chip 24 near the polarizer 32 in optically coaxial alignment, and the first array 34 is joined to an end b of the optical IC chip 24 near the phase modulator 30 in optically coaxial alignment.

The first and second arrays 34, 36 joined, i.e., bonded by an adhesive, to the optical IC chip 24 in optically coaxial alignment for maximum optical output power.

Figure 5A:
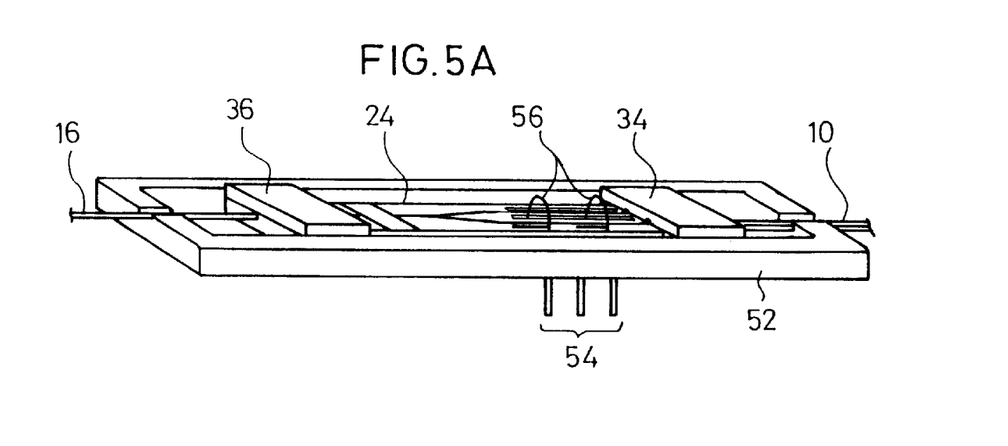
FIG. 5A is a perspective view of packaging step and a wire bonding step.
Figure 5B:
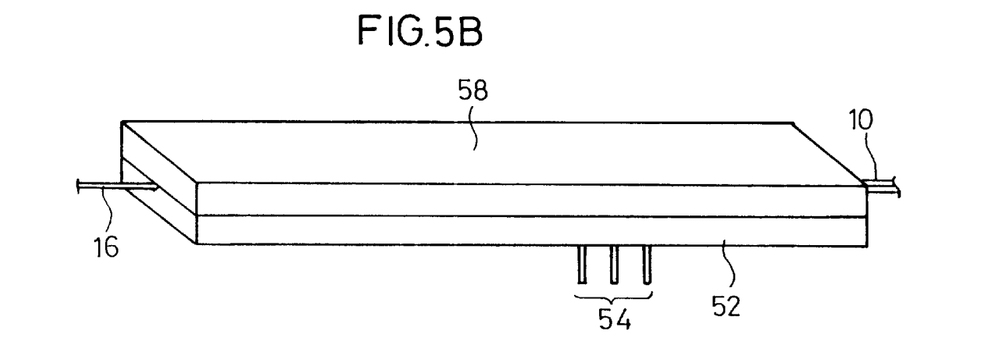
FIG. 5B is a perspective view of the optical IC chip that has been packaged.

After the first and second arrays 34, 36 joined to the optical IC chip 24, the optical IC chip 24 is housed in a package housing 52 (see FIG. 5A), and lead terminals 54 extending downwardly from the package housing 52 are electrically connected to an electrically conductive pad of the phase modulator 30 on the optical IC chip 24 by bonding wire 56. Thereafter, as shown in FIG. 5B, the package housing 52 is covered with a lid 58.

The optical fiber 10 extending from the fiber coil 12 and the optical fiber 16 extending from the coupler 22 are joined to the optical IC chip 24 according to the above assembling process.

An assembly jig according to the present invention which is used in the above assembling process will be described below with reference to FIGS. 6, 7, 8A, 8B, 9A and 9B.

Figure 6:
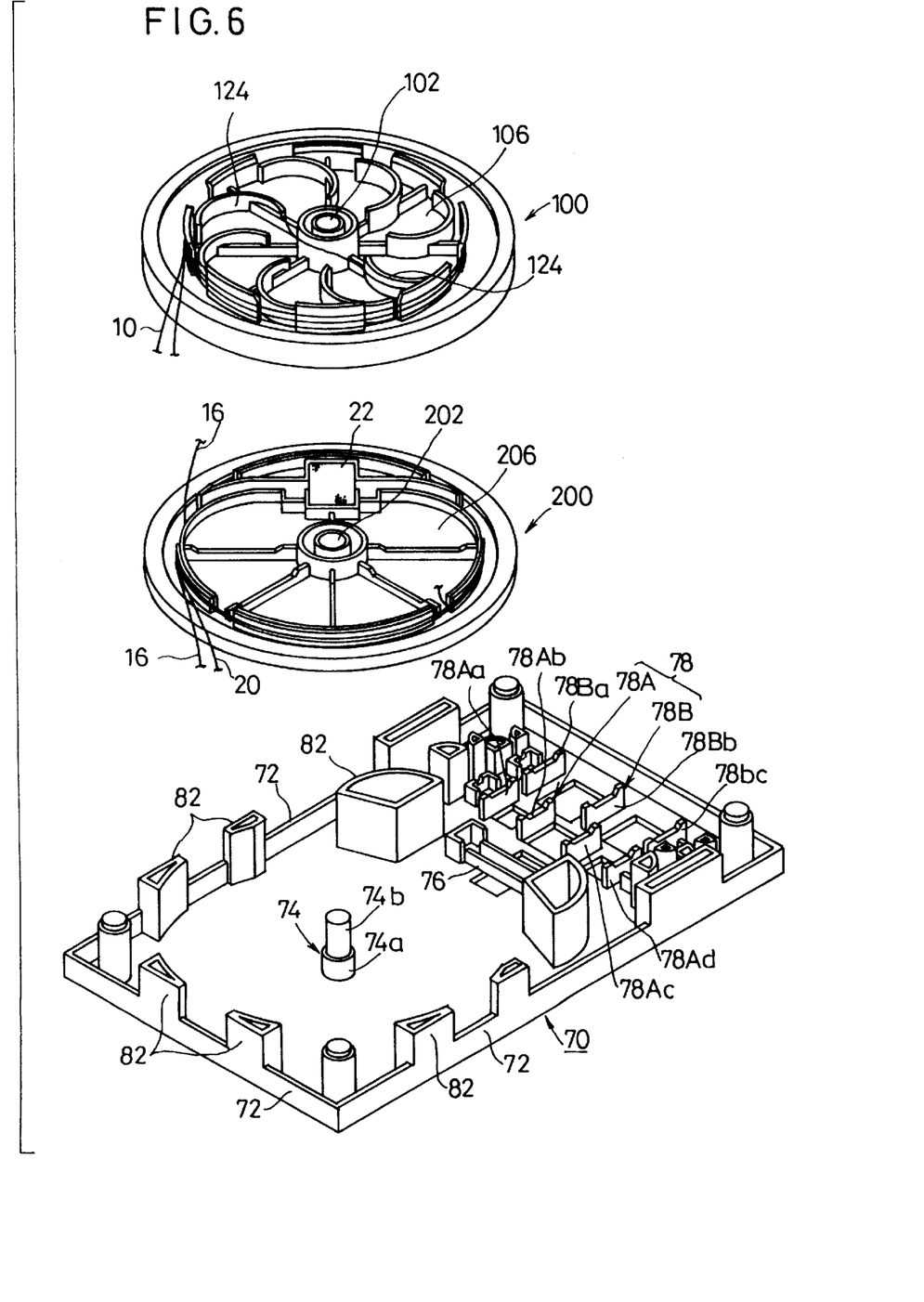
FIG. 6 is an exploded perspective view of the assembly jig according to the present invention, a fiber coil reel, and a coupler reel.
Figure 7:
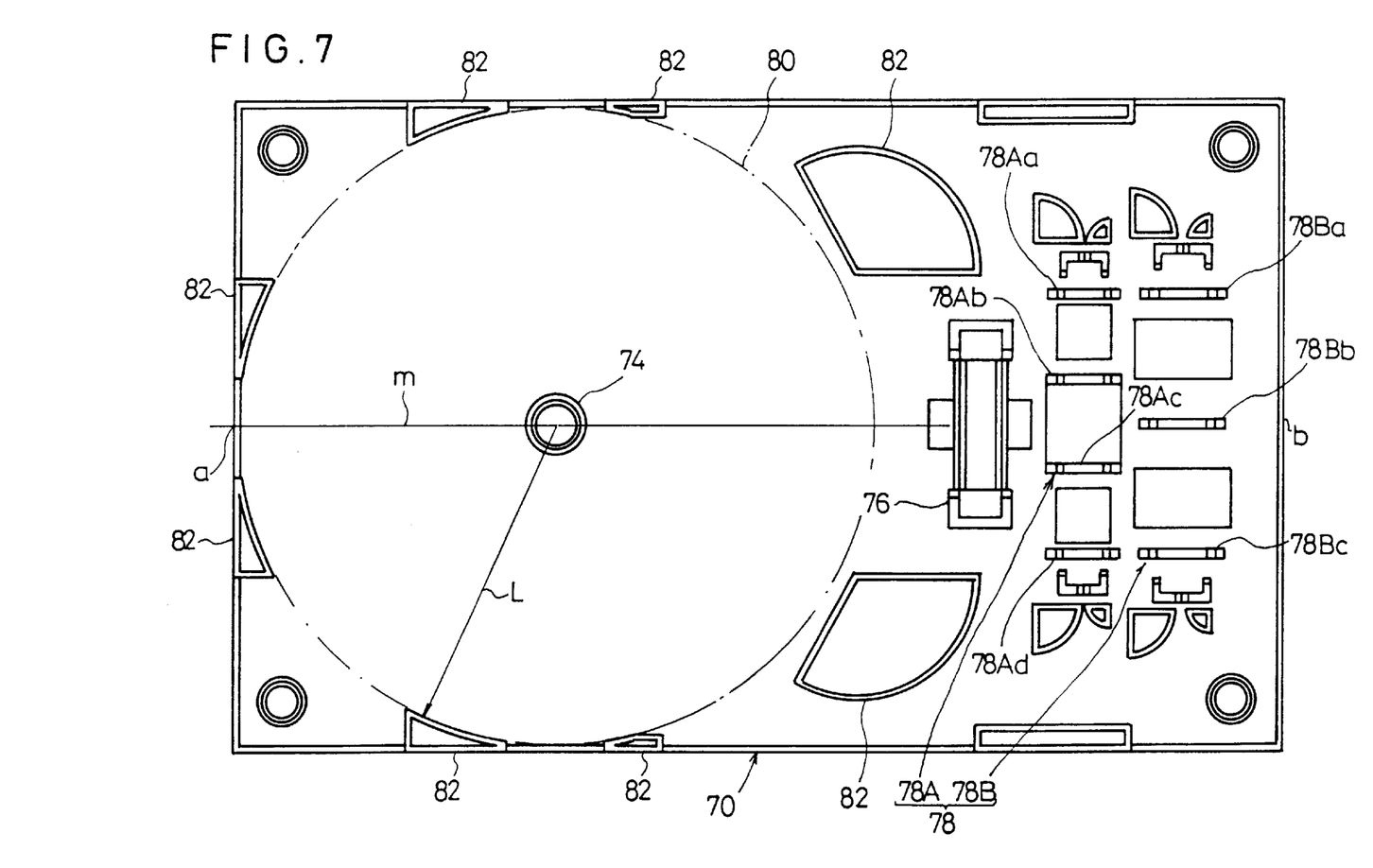
FIG. 7 is a plan view of the assembly jig.

As shown in FIGS. 6 and 7, the assembly jig, generally designated by the reference numeral 70, comprises an upwardly open box of an elongate rectangular shape having upwardly extending side walls 72 along respective sides of a base plate thereof, the box being integrally molded of resin, for example. The assembly jig 70 has a support shaft 74 integrally formed of resin with the bottom of the box at a position slightly displaced off the center, and a chip support base 76 and a package working base 78 integrally formed of synthetic resin with the bottom of the box at a position spaced from the support shaft 74. The support shaft 74 is positioned on a longitudinal central axis m of the assembly jig 70 more closely to a longitudinal end a of the assembly jig 70 than an opposite longitudinal end b of the assembly jig 70, and the chip support base 76 and the package working base 78 are positioned closer to the longitudinal end b of the assembly jig 70.

As shown in FIG. 6, the support shaft 74 has an annular step in a vertically intermediate position, and includes a lower portion 74a below the annular step and an upper portion 74b above the annular step, the lower portion 74a being larger in diameter than the upper portion 74b.

The package working base 78 has two support bases, one of which serves as a package housing support base 78A for placing and fixing the package housing 52 in position, and the other as a lid support base 78B for placing and fixing the lid 58 in position.

The package housing support base 78A is positioned on the central axis m between the chip support base 76 and the end b and spaced from the chip support base 76 by about ⅓ of the distance between the chip support base 76 and the end b. The package housing support base 78A comprises four upstanding members 78Aa–78Ad extending upwardly from the bottom of the assembly jig 70 parallel to each other.

The lid support base 78B is positioned on the central axis m between the chip support base 76 and the end b and spaced from the chip support base 76 by about ⅔ of the distance between the chip support base 76 and the end b. The package housing support base 78B comprises three upstanding members 78Ba–78Bc extending upwardly from the bottom of the assembly jig 70 parallel to each other.

The assembly jig 70 also has a plurality of partition bases 82 integrally formed of synthetic resin with the bottom of the box at spaced positions and defining a circular reel support area 80 extending around the support shaft 74 and having a radius of L from the support shaft 74. In the circular reel support area 80, there are rotatably disposed a fiber coil reel 100 around which the optical fiber 10 of the fiber coil 12 is wound and a coupler reel 200 around which the optical fiber 16 extending from the coupler 22 is wound.

Figure 8A:
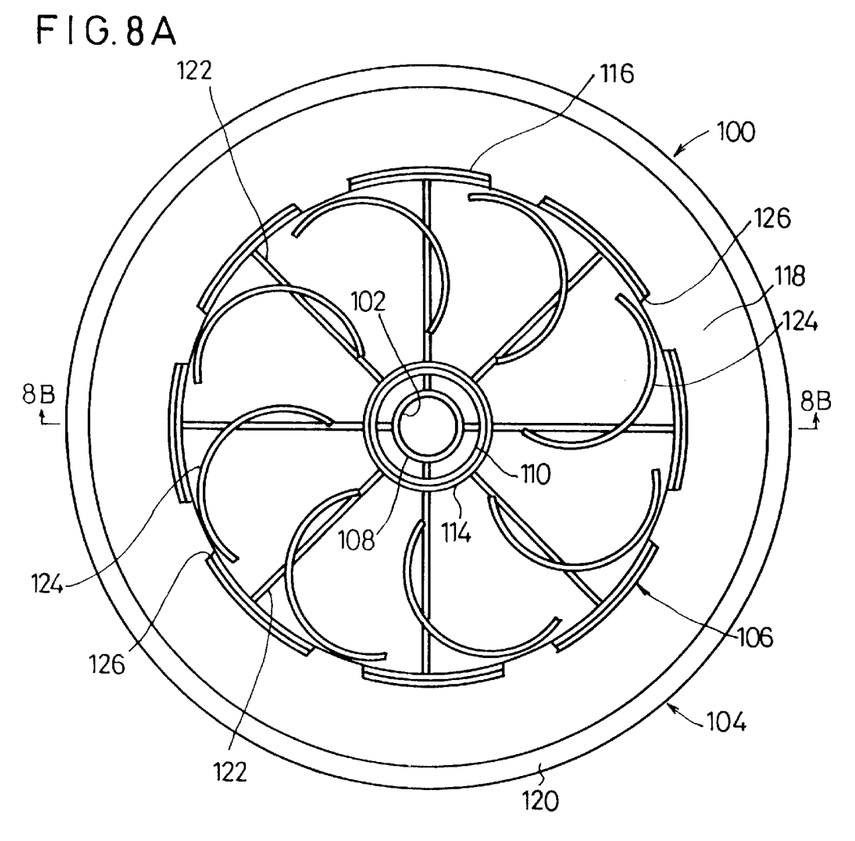
FIG. 8A is a plan view of the fiber coil reel.
Figure 8B:
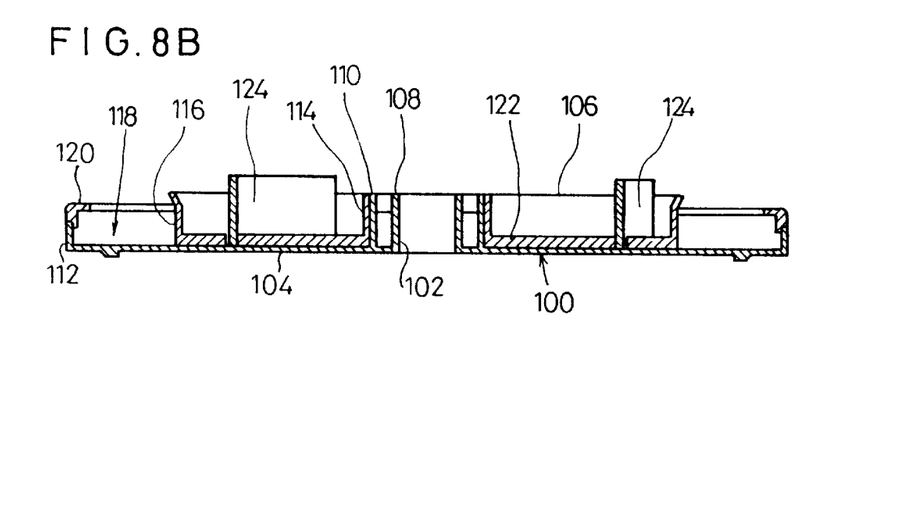
FIG. 8B is a cross-sectional view taken along line 8B—8B of FIG. 8A.

As shown in FIGS. 8A and 8B, the fiber coil reel 100 comprises a circular base 104 of synthetic resin having a central through hole 102 defined therein and a ring 106 disposed on the circular base 104 for winding the optical fiber 10 in an opposite direction.

The circular base 104 comprises a first annular inner wall 108 extending upwardly along an outer circumferential edge of the central through hole 102, a second annular inner wall 110 larger in diameter than the first annular inner wall 108 and extending upwardly concentrically with the first annular inner wall 108, and an annular outer wall 112 extending upwardly along an outer circumferential edge of the circular base 104.

The ring 106 has an inside diameter substantially equal to the outside diameter of the second inner wall 110 of the circular base 104 and an outside diameter smaller than the outside diameter of the circular base 104, and includes an inner wall 114 extending upwardly along the outer circumferential surface of the second inner wall 110 and an outer wall 116 extending upwardly along, but spaced radially inwardly from, the outer circumferential edge of the circular base 104.

The inner surface of the outer wall 112 of the circular base 104 and the outer surface of the outer wall 116 of the ring 106 jointly define therebetween an annular winding space 118. The elongate optical fiber 10 (not shown in FIGS. 8A and 8B) is wound around the outer wall 116 in the winding space 118. The outer wall 112 has an annular holder flange 120 on an upper edge thereof for preventing the wound optical fiber 10 from being dislodged out of the winding space 118. The annular holder flange 120 has an inside diameter greater than the outside diameter of the ring 106, with the winding space 118 being open upwardly radially therebetween, so that the optical fiber 10 can easily be wound around the outer wall 116 either manually or by an automatic winding device.

The ring 106 has a plurality of (eight in FIG. 8A) radial reinforcing support arms 122 angularly spaced at equally spaced angular intervals and integrally formed with the bottom of the ring 106, and a plurality of (eight in FIG. 8A) semicircular guides 124 integrally with or separately from the bottom of the ring 106 respectively on the support arms 122. In FIG. 8A, the ring 106 has four pairs of circular guides 124 in point symmetry.

The outer wall 116 has a plurality of (eight in FIG. 8A) recesses 126 defined therein at equally spaced angular intervals. Each of the recesses 126 is positioned across a point where the circumferential edge of the outer wall 116 crosses a radial line segment that passes the center of the ring 106 and bisects the angle formed between two adjacent support arms 122. Each of the guides 124 has a portion positioned immediately radially inwardly of and confronting one of the recesses 126.

While the optical fiber 10 is being wound around the outer wall 116 in one direction therearound, one of the pairs of semicircular guides 124 may be selected, and the optical fiber 10 may be passed through one of the recesses 126 which confronts one of the selected semicircular guides 124, extended along a convex semicircular surface thereof and then along a convex semicircular surface of the other of the selected semicircular guides 124, passed through other one of the recesses 126 which confronts the other recess 126, so that the optical fiber 10 extending out of the other recess 126 may be wound around the outer wall 116 in the opposite direction. Therefore, each of the pairs of semicircular guides 124 serves as a winding direction reverser for reversing the direction in which optical fiber 10 is wound around the outer wall 116. The pairs of semicircular guides 124 as the winding direction reverser may not be positioned in point symmetry insofar as they can be used to reverse the direction in which optical fiber 10 is wound around the outer wall 116.

Figure 9A:
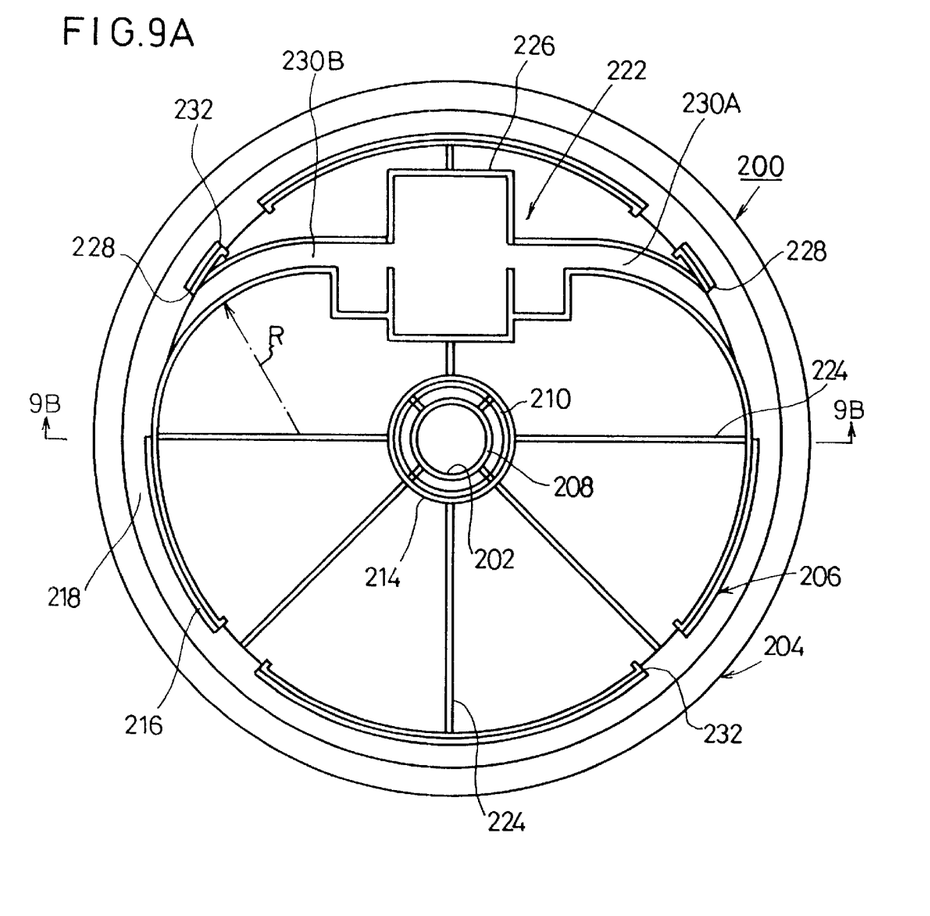
FIG. 9A is a plan view of the coupler reel.
Figure 9B:
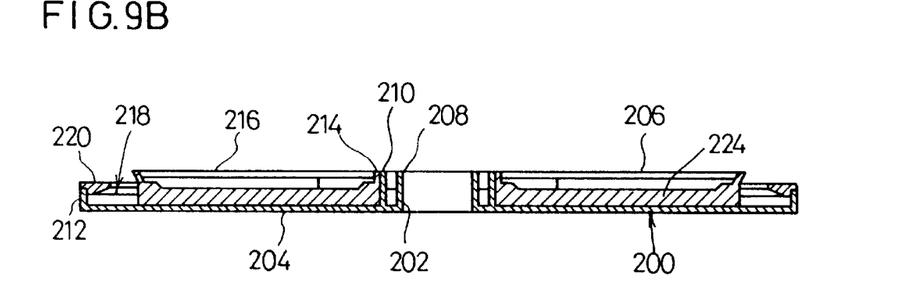
FIG. 9B is a cross-sectional view taken along line 9B—9B of FIG. 9A.

As shown in FIGS. 9A and 9B, the coupler reel 200 is basically similar in structure to the fiber coil reel 100. The coupler reel 200 comprises a circular base 204 of synthetic resin having a central through hole 202 defined therein and a ring 206 disposed on the circular base 204 for housing the coupler 22.

The circular base 204 comprises a first annular inner wall 208 extending upwardly along an outer circumferential edge of the central through hole 202, a second annular inner wall 210 larger in diameter than the first annular inner wall 208 and extending upwardly concentrically with the first annular inner wall 208, and an annular outer wall 212 extending upwardly along an outer circumferential edge of the circular base 204.

The ring 206 has an inside diameter substantially equal to the outside diameter of the second inner wall 210 of the circular base 204 and an outside diameter smaller than the outside diameter of the circular base 204, and includes an inner wall 214 extending upwardly along the outer circumferential surface of the second inner wall 210 and an outer wall 216 extending upwardly along, but spaced radially inwardly from, the outer circumferential edge of the circular base 204.

The inner surface of the outer wall 212 of the circular base 204 and the outer surface of the outer wall 216 of the ring 206 jointly define therebetween an annular winding space 218. The optical fiber 16 (not shown in FIGS. 9A and 9B) is wound around the outer wall 216 in the winding space 218. The outer wall 212 has an annular holder flange 220 on an upper edge thereof for preventing the wound optical fiber 16 from being dislodged out of the winding space 218. The annular holder flange 220 has an inside diameter greater than the outside diameter of the ring 206, with the winding space 218 being open upwardly radially therebetween, so that the optical fiber 16 can easily be wound around the outer wall 216 either manually or by an automatic winding device.

The ring 206 has a coupler housing structure 222 for housing and holding the coupler 22 (not shown in FIGS. 9A and 9B). The coupler housing structure 222 is disposed on the bottom of the ring 206 in a portion thereof (shown in an upper half of the ring 206 in FIG. 9A). The ring 206 has a plurality of (five in FIG. 9A) radial reinforcing support arms 224 angularly spaced at equally spaced angular intervals and integrally formed with the bottom of the ring 206 in a portion thereof (shown in a lower half of the ring 206 in FIG. 9A). The coupler housing structure 222 comprises a frame 226 complementary in shape to the coupler 22 and two optical fiber guide passages 230A, 230B extending from respective opposite sides of the frame 226 toward and connected to respective recesses 228 that are defined in the outer wall 216 of the ring 206.

In FIG. 9A, the frame 226 defines an housing space in the shape of a rectangular parallelopiped for housing the coupler 22 which is assumed to be in the shape of a rectangular parallelopiped. The two optical fiber guide passages 230A, 230B extend straight laterally over a given distance from the frame 226, and then extend beyond the given distance along a curved path having a radius R of curvature to the recesses 228 in the outer wall 216. The radius R of curvature is selected such that the optical fibers 16, 20 extending from the coupler 22 will smoothly be guided along the optical fiber guide passages 230A, 230B into the winding space 218 and will not adversely affect light propagated through the optical fibers 16, 20. The outer wall 216 also has four recesses 232 defined therein at equally spaced angular intervals.

Dimensional differences between the circular bases 104, 204 will be described below. The circular base 104 has an inside diameter smaller than the circular base 204 and substantially equal to the diameter of the upper portion 74b of the support shaft 74 of the assembly jig 70 shown in FIG. 6. The circular base 204 has an inside diameter substantially equal to the diameter of the lower portion 74a of the support shaft 74. The circular base 104 and the ring 106 have respective heights that are greater than respective heights of the circular base 204 and the ring 206.

The reels 100, 200 are rotatably installed in the circular reel support area 80 of the assembly jig 70 as follows: First, the coupler reel 200 which is of a lower profile is rotatably fitted over the lower portion 74a of the support shaft 74 that is fitted in the through hole 202, and then the fiber coil reel 100 is fitted over the upper portion 74b of the support shaft 74 that is fitted in the through hole 102. The fiber coil reel 100 is thus rotatably supported on the support shaft 74 above the coupler reel 200 that is also rotatably supported on the support shaft 74.

A process of assembling an optical fiber gyro using the assembly jig 70 will be described below with reference to FIGS. 10A–10C and 11A, 11B. In FIGS. 10A–10C and 11A, 11B, only major components are illustrated for an easier understanding of the winding of optical fibers around the reels 100, 200 and the packaging of an optical IC chip.

Figure 10A:
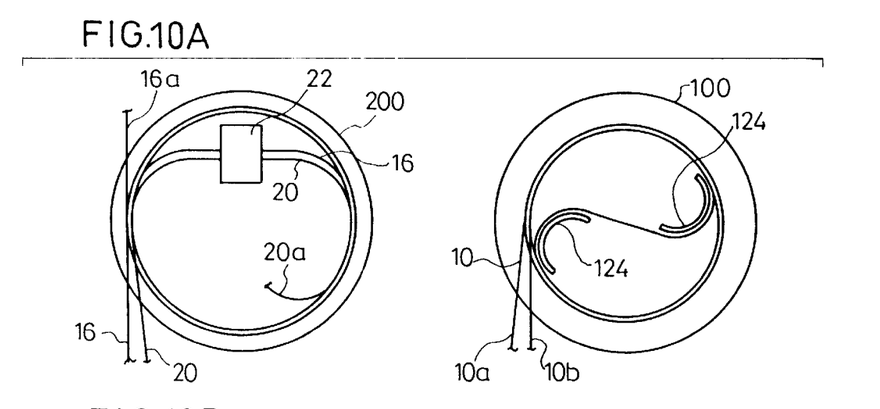
FIG. 10A is a view of a winding step for winding optical fibers around the reels in assembling the optical fiber gyro with the assembly jig.

As shown in FIG. 10A, an elongate optical fiber 10 is wound around the fiber coil reel 100, and a coupler 22 is housed in the frame 226 (see FIG. 9A) of the coupler reel 200. The optical fibers 16, 20 extending from the coupler 22 are wound around the coupler reel 200.

Specifically, as shown in FIGS. 8A and 8B, an elongate optical fiber 10 is wound around the fiber coil reel 100 by gripping a starting end 10b of the optical fiber 10, introducing the optical fiber 10 into the winding space 118 of the reel 100, and winding the optical fiber 10 clockwise, for example, around the outer wall 116 of the ring 106. A final turn of the optical fiber 10 is extended along a desired one of the pairs of guides 124 of the ring 106 to reverse the direction in which the optical fiber 10 is wound, thus leading a terminal end 10b of the optical fiber 10 toward the starting end 10a. The process of winding the optical fiber 10 around the fiber coil reel 100 is now completed.

The optical fibers 16, 20 extending from the coupler 22 housed in the frame 226 are wound around the coupler reel 220 by pulling two optical fibers (an optical fiber 16 to be connected to an optical IC chip and an unused optical fiber 20) extending from a right end of the coupler 22 as viewed in FIG. 10A through the right optical fiber guide passage 230A as viewed in FIG. 9A into the winding space 218, winding the two optical fibers 16, 20 clockwise, for example, around the outer wall 216 of the ring 206, leading a starting end 16a of the optical fiber 16 to be connected to an optical IC chip 24 out of the reel 200, and storing a starting end 20a of the unused optical fiber 20 in the ring 206.

Then, two optical fibers (an optical fiber 16 to be connected to the light source 14 shown in FIG. 1 and an optical fiber 20 to be connected to the photodetector 18) extending from a left end of the coupler 22 as viewed in FIG. 10A are pulled through the left optical fiber guide passage 230B as viewed in FIG. 9A into the winding space 218, and then wound counterclockwise, for example, around the outer wall 216 of the ring 206, and their ends are led out of the reel 200. The process of winding the optical fibers 16, 20 extending from the coupler 22 around the coupler reel 200 is now finished.

Figure 10B:
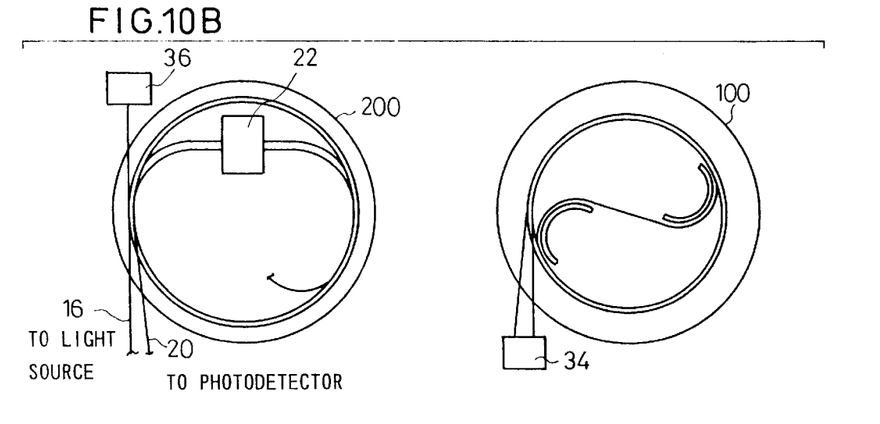
FIG. 10B is a view of a bonding step for bonding the arrays to the ends of the optical fibers in assembling the optical fiber gyro with the assembly jig.

Then, as shown in FIG. 10B, the first array 34 is bonded to the starting and terminal ends 10a, 10b of the optical fiber 10 that extend out of the fiber coil reel 100, and the second array 36 is bonded to the end 16a of the optical fiber 16 of those optical fibers 16, 20 that extend out of the coupler reel 200. The first and second arrays 34, 36 are bonded to the optical fibers 10, 16, respectively, according to the processes that have been described above with reference to FIGS. 2A, 2B and 3A, 3B.

Then, as shown in FIG. 2B, the end 34a of the first array 34 where free ends of the ends 10a, 10b of the optical fiber 10 are exposed is ground, and as shown in FIG. 3B, the end 36a of the second array 36 where a free end of the optical fiber 16 is exposed is ground.

The end 34a of the first array 34 is ground by a grinding device which may comprise a lapping disk rotated by a motor and a lapping sheet fixed to the lapping disk.

Since it is necessary to grind the first array 34 that is fixed to the ends 10a, 10b of the optical fiber 10 extending from the reel 100, it is preferable to use a grinding jig which comprises a reel support base for supporting a plurality of reels 100 and an array fixture disposed below the reel support base for securing a plurality of first arrays 34 connected to the reels 100 at a desired angle, with ends 34a of the first arrays 34 being exposed at the bottom of the array fixture.

The bottom of the array fixture is held against the rotating lapping sheet of the grinding device to grind the ends 34a of the first arrays 34 at an angle matching the slope of the end a of an optical IC chip 24.

Figure 10C:
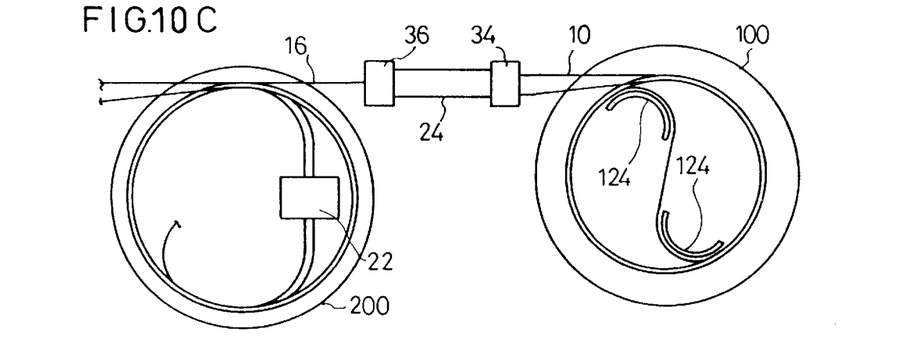
FIG. 10C is a view of an optically connecting step for optically connecting the optical fibers to the optical IC chip in assembling the optical fiber gyro with the assembly jig.

Thereafter, as shown in FIG. 10C, the optical IC chip 24 with the phase modulator 30 and the polarizer 32 mounted on the optical waveguide 28 is held in position, and the first and second arrays 34, 36 to which the optical fibers 10, 16 are bonded, respectively, are joined to the optical IC chip 24. The optical fibers 10, 16 are bonded to the first and second arrays 34, 36 according to the process described above with reference to FIGS. 4A and 4B.

Figure 11A:
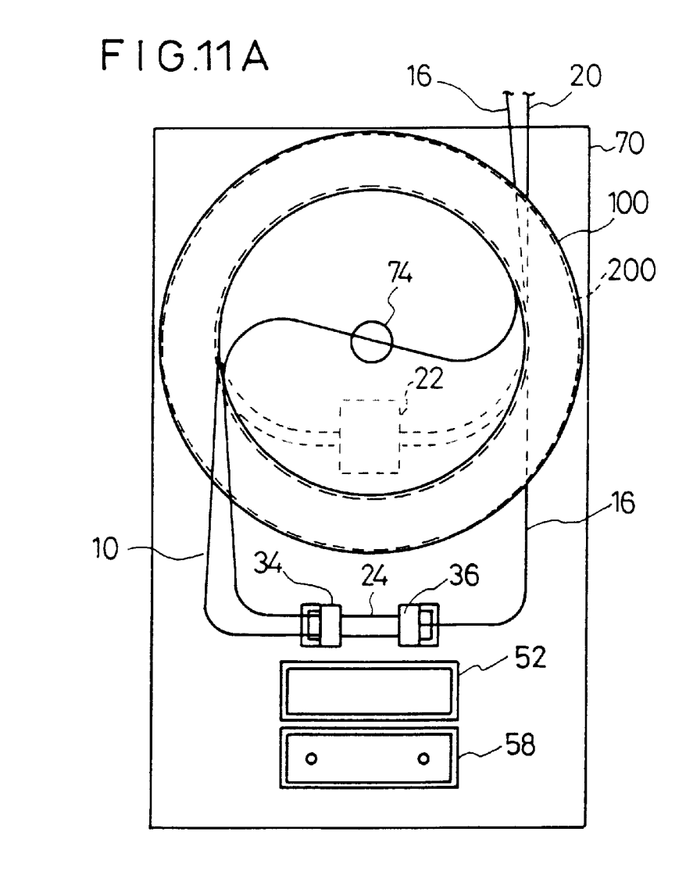
FIG. 11A is a plan view showing the fiber coil reel and the coupler reel which are placed on the assembly jig and the optical IC chip which is placed on a chip support base.

After the first and second arrays 34, 36 are joined to the optical IC chip 24, as shown in FIG. 11A, the coupler reel 200 with the optical fibers 16, 20 wound therearound is rotatably fitted over the lower portion 74a (see FIG. 6) of the support shaft 70 which is fitted in the through hole 202, and hence rotatably is placed in the circular reel support area 80. Then, the fiber coil reel 100 with the optical fiber 10 wound therearound is rotatably fitted over the upper portion 74b (see FIG. 6) of the support shaft 70 which is fitted in the through hole 202, and hence is rotatably placed above the coupler reel 200 in the circular reel support area 80. The optical IC chip 24 to which the optical fibers 10, 16 are joined through the first and second arrays 34, 36 is temporarily placed on the chip support plate 76 (see FIG. 6) of the assembly jig 70.

Then, the package housing 52 is placed on and fixed to the package housing support base 78A (see FIG. 6) of the assembly jig 70, and the lid 58 is placed on the lid support base 78B.

Figure 11B:
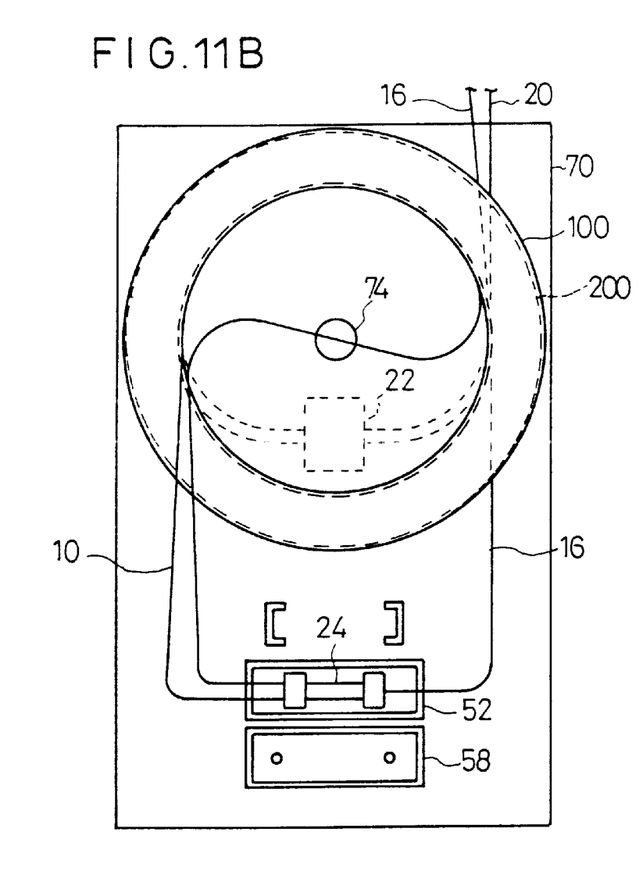
FIG. 11B is a plan view showing the optical IC chip housed in a package casing.

Thereafter, as shown in FIG. 11B, the optical IC chip 24 is removed from the chip support plate 76, and housed in the package housing 52 that is placed on and fixed to the package housing support base 78A. When the optical IC chip 24 is moved onto the package housing support base 78A, the reels 100, 200 are rotated to unreel the optical fibers 10, 16 freely.

Subsequently, as described above with reference to FIG. 5A, the lead terminals 54 extending downwardly from the package housing 52 are electrically connected to the electrically conductive pad of the phase modulator 30 on the optical IC chip 24 by wire bonding.

As described above with reference to FIG. 5B, the lid 58 is removed from the lid support base 78B and placed on the package housing 52, and the lid 58 and the package housing 52 are joined to each other.

The process of joining the optical fiber 10 extending from the fiber coil 12 and the optical fiber 16 extending from the coupler 22 to the optical IC chip 24 is finished.

With the assembly jig 70, the optical IC chip 24 is moved from the chip support plate 76 onto the package housing support base 78A, and packaged on the package housing support base 78A.

At this time, the optical IC chip 24 can quickly be packaged on the package housing support base 78A. The assembly jig 70 is free of various shortcomings that would otherwise occur if the optical IC chip 24 were packaged separately. Those shortcomings include (a) the need for storing and managing a number of optical IC chips 24 that are optically coupled to the optical fibers 10, 16, and (b) the need for feeding optical IC chips 24 optically coupled to the optical fibers 10, 16 to a packaging facility (such as a storage facility) while taking care to prevent the optical joints from being disintegrated. The assembly jig 70 is thus capable of simplifying the assembling installation and reducing the number of assembling steps.

In the illustrated embodiment, because the fiber coil reel 100 is employed, it is only necessary to wind the elongate optical fiber 10 around the fiber coil reel 100 by a predetermined number of turns for manufacturing the fiber coil 12. Therefore, the fiber coil 12 can be manufactured very easily in a short period of time.

Since the assembly jig 70 has the circular reel support area 80 where the reel 100 is rotatably supported, when the optical IC chip 24 is to be packaged, it is possible to place the fiber coil reel 100 rotatably in the circular reel support area 80, thereafter temporarily place the optical IC chip 24 on the chip support base 76, and then move the optical IC chip 24 onto the package housing support base 78A for packaging the optical IC chip 24. When optical IC chip 24 is moved onto the package housing support base 78A, the reels 100, 200 are rotated to unreel the optical fibers 10, 16 freely. Therefore, the packaging process is facilitated and will be finished in a short period of time.

In the illustrated embodiment, the coupler reel 200 around which given turns of the optical fibers 16, 20 extending in opposite directions from the coupler 22 are wound is rotatably placed in the circular reel support area 80. The optical fibers 16, 20 which are very long that extend from the coupler 22 can be wound around and accommodated on the coupler reel 200, and the coupler reel 200 with the optical fibers 16, 20 accommodated thereon can rotatably be placed in the circular reel support area 80. As with the fiber coil reel 100, when the optical IC chip 24 is moved onto the package housing support base 78A, the reel 200 is rotated, allowing the optical fibers 16, 20 to be unreeled freely therefrom. As a result, the packaging process is carried out easily and will be finished in a short period of time. When the optical IC chip 24 is being packaged, the elongate optical fibers 16, 20 drawn from the coupler 22 do not present an obstacle, and do not impose an undue load on the optical IC chip 24.

Inasmuch as the coupler reel 200 is rotatably fitted over the lower portion 74a of the support shaft 74, and the fiber coil reel 100 is rotatably fitted over the upper portion 74b of the support shaft 74, these reels 100, 200 are rotatably supported on the assembly jig 70. Thus, the optical fibers 10, 16 are independently unreeled from the respective reels 100, 200, permitting the optical IC chip 24 to be packaged on the package housing support base 78A.

According to the illustrated process of assembling the optical fiber gyro, after the optical fiber 10 extending from the fiber coil 12 and the optical fiber 16 extending from the coupler 22 are optically coupled to the optical IC chip 24, the optical IC chip 24 is temporarily placed on the chip support base 76 and thereafter housed in the package housing 52 that has been placed on and fixed to the package housing support base 78A, and the lid 58 is removed from the lid support base 78B and placed on the package housing 52, and then joined to the package housing 52, thereby packaging the optical IC chip 24.

Because the optical IC chip 24 is placed on and fixed to the chip support base 76, the optical fibers 10, 16 can optically be coupled to the optical IC chip 24 highly efficiently with ease. As the optical IC chip 24 is packaged on the package housing support base 78A positioned adjacent to the chip support base 76, the optical IC chip 24 can quickly be packaged after the optical fibers 10, 16 have optically been coupled to the optical IC chip 24. Therefore, the assembly jig 70 is free of various shortcomings that would otherwise occur if the optical IC chip 24 were packaged separately. The assembly jig 70 is thus capable of simplifying the assembling installation and reducing the number of assembling steps.

When the starting and terminal ends of the optical fibers 10, 16 are optically coupled to the optical IC chip 24, it is possible to determine the distance between the ends of the optical fibers 10, 16 beforehand with the first and second arrays 34, 36 in conformity with the joint areas of the optical IC chip 24. Since the plane of polarization of light propagated through the optical fibers 10, 16 can be aligned in advance with the plane of polarization of light propagated through the optical waveguide 28, when the optical fibers 10, 16 are actually optically coupled to the optical IC chip 24, it is not necessary to take into account the above distance and planes of polarization, and hence the optical coupling process can be performed highly efficiently.

According to the illustrated assembling process, the fiber coil reel 100 is rotatably placed in the circular reel support area 80 substantially at the same time that the optical IC chip 24 is optically connected to the optical fibers 10, 16.

For making the fiber coil 12, it is only required to wind the elongate optical fiber 10 a predetermined turns around the fiber coil reel 10. As a consequence, the fiber coil 12 can easily be produced in a short period of time.

As the assembly jig 70 has the circular reel support area 80, when the optical IC chip 24 is to be packaged, the fiber coil reel 100 is rotatably placed in the circular reel support area 80, thereafter the optical IC chip 24 is temporarily placed on the chip support base 76 and then moved onto the package housing support base 78A for packaging the optical IC chip 24.

When optical IC chip 24 is moved onto the package housing support base 78A, the reels 100, 200 are rotated to unreel the optical fibers 10, 16 freely. Therefore, the packaging process is facilitated and will be finished in a short period of time.

In the process of assembling the optical fiber gyro, the coupler reel 200 around which the optical fibers 16 drawn in opposite directions from the coupler 22 are wound a given number of turns is rotatably placed in the circular reel support base 80.

The optical fibers 16 which are very long that extend from the coupler 22 can be wound around and accommodated on the coupler reel 200, and the coupler reel 200 with the optical fibers 16 accommodated thereon can rotatably be placed in the circular reel support area 80. As with the fiber coil reel 100, when the optical IC chip 24 is moved onto the package housing support base 78A, the reel 200 is rotated, allowing the optical fibers 16, 20 to be unreeled freely therefrom. As a result, the packaging process is carried out easily and will be finished in a short period of time. When the optical IC chip 24 is being packaged, the elongate optical fibers 16, 20 drawn from the coupler 22 do not present an obstacle, and do not impose an undue load on the optical IC chip 24.

After the coupler reel 200 is rotatably placed in position in the circular reel support area 80, the fiber coil reel 100 is independently rotatably placed in position over the coupler reel 200. Since the optical fibers 10, 16 can independently be drawn respectively from the reels 100, 200, the process of packaging the optical IC chip 24 on the package housing support base 78A is highly facilitated.

Although a certain preferred embodiment of the present invention has been shown and described in detail, it should be understood that various changes and modifications may be made therein without departing from the scope of the appended claims.

What is claimed is:

1. An optical fiber gyro (FOG) device in operative combination with assembly jig, said device comprising:
    a fiber coil comprising a predetermined number of turns of an elongated optical fiber;
    an optical coupler for connecting an optical fiber extending from a light source to an optical fiber extending to a photodetector;
    an optical IC chip connected between the fiber coil and the optical coupler and having a phase modulator and a polarizer which are mounted on an optical waveguide;
    and said assembly jig comprising:
    a base plate;
    a chip support portion of said base plate supporting the optical IC chip for optical connection to optical fibers;
    a coil reel support portion of said base plate supporting a fiber coil reel rotatably mounted therein around which a plurality of turns of optical fiber are wound thus comprising the fiber coil;
    a coupler reel mounted coaxially with and upon the fiber coil reel, and supporting the coupler, around which coupler reel at least one turn of each of two optical fibers are wound extending in opposite directions from the coupler.

2. The FOG device assembly jig combination according to claim 1, wherein the optical IC chip is packaged in a package housing.

3. The FOG device assembly jig combination according to claim 2, wherein said IC chip in said package housing is located in said chip support base portion of said base plate.

4. The FOG device assembly jig combination according to claim 1, wherein said base plate also comprises lid support means for supporting a lid to cover said package housing.

5. The FOG device assembly jig combination according to claim 4, wherein said assembly additionally includes a lid.

6. The FOG device assembly jig combination according to claim 1, wherein said fiber coil reel additionally comprises a capstan on one surface of the coil reel for reversing the direction of one end of an optical fiber wound on said coil reel.

7. The fog device assembly jig combination according to claim 1, wherein said fiber coil reel and said coupler reel are rotable independently of each other.

* * * * *